United States Patent [19]
Payne

[11] Patent Number: 5,705,200
[45] Date of Patent: Jan. 6, 1998

[54] MULTIAXIS ROTATIONAL MOLDING APPARATUS

[76] Inventor: LeRoy Payne, 3300 Nicholas La., Molt, Mont. 59057

[21] Appl. No.: 581,943

[22] Filed: Jan. 2, 1996

Related U.S. Application Data

[60] Division of Ser. No. 345,564, Nov. 25, 1994, Pat. No. 5,503,780, which is a continuation-in-part of Ser. No. 249,744, May 26, 1994, Pat. No. 5,507,632, which is a continuation-in-part of Ser. No. 950,135, Sep. 24, 1992, Pat. No. 5,316,701, which is a division of Ser. No. 707,656, May 30, 1991, Pat. No. 5,188,845, which is a continuation-in-part of Ser. No. 417,502, Oct. 5, 1989, Pat. No. 5,022,838, which is a continuation-in-part of Ser. No. 271,686, Nov. 16, 1988, Pat. No. 4,956,133, which is a continuation-in-part of Ser. No. 202,267, Jun. 6, 1988, Pat. No. 4,956,135, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.$^6$ .......................... B29C 41/06; B29C 41/52
[52] U.S. Cl. .......................... 425/4 R; 264/2.1; 264/405; 264/310; 425/150; 425/429; 425/430; 425/435
[58] Field of Search .......................... 425/429, 150, 425/430, 435, 4 R, 145, 147; 264/1.24, 1.28, 1.7, 2.1, 40.1, 40.2, 40.5, 40.6, 40.7, 255, 310, 311, 312, 328.8, 328.11, 297.2

[56] References Cited

U.S. PATENT DOCUMENTS

| | | | |
|---|---|---|---|
| 4,956,135 | 9/1990 | Payne | 425/435 |
| 5,011,636 | 4/1991 | Payne | 425/435 |
| 5,022,838 | 6/1991 | Payne | 425/435 |
| 5,316,701 | 5/1994 | Payne | 425/429 |

Primary Examiner—Tim Heitbrink
Attorney, Agent, or Firm—Arthur L. Urban

[57] ABSTRACT

A method of continuously forming an integrally molded structure in a multiaxis rotational molding operation includes the steps of rotating a multisection mold assembly about at least three axes. A first freshly formed polymerizable mixture is flowed over surfaces of an enclosed mold cavity within the multisection mold assembly. The flowing of the first mixture over the mold cavity surfaces and formation of a first resin therefrom is monitored. A second freshly formed polymerizable mixture is flowed under pressure through an orifice into the mold cavity. A liquid stream of the second mixture is formed. The liquid stream is gelled as it advances through the mold cavity to form a continuous filament with structural integrity. The filament is contacted with the first resin formed within the mold cavity. The filament is distributed over the first resin in a preselected pattern. A third freshly formed polymerizable mixture is flowed over the filament pattern formed within the mold cavity with the second mixture. The flowing of the third mixture and formation of a third resin therefrom is monitored. The rotation of the multisection mold assembly is continued throughout the steps of the continuous molding operation while monitoring individually each axis rotation of the multisection mold assembly. The monitored flowing of each mixture and the monitored formation of each resin with each monitored axis rotation is coordinated in a preselected profile to form the integrally molded structure of the first, second and third resins. Also, apparatus forming the structure is included.

7 Claims, 1 Drawing Sheet

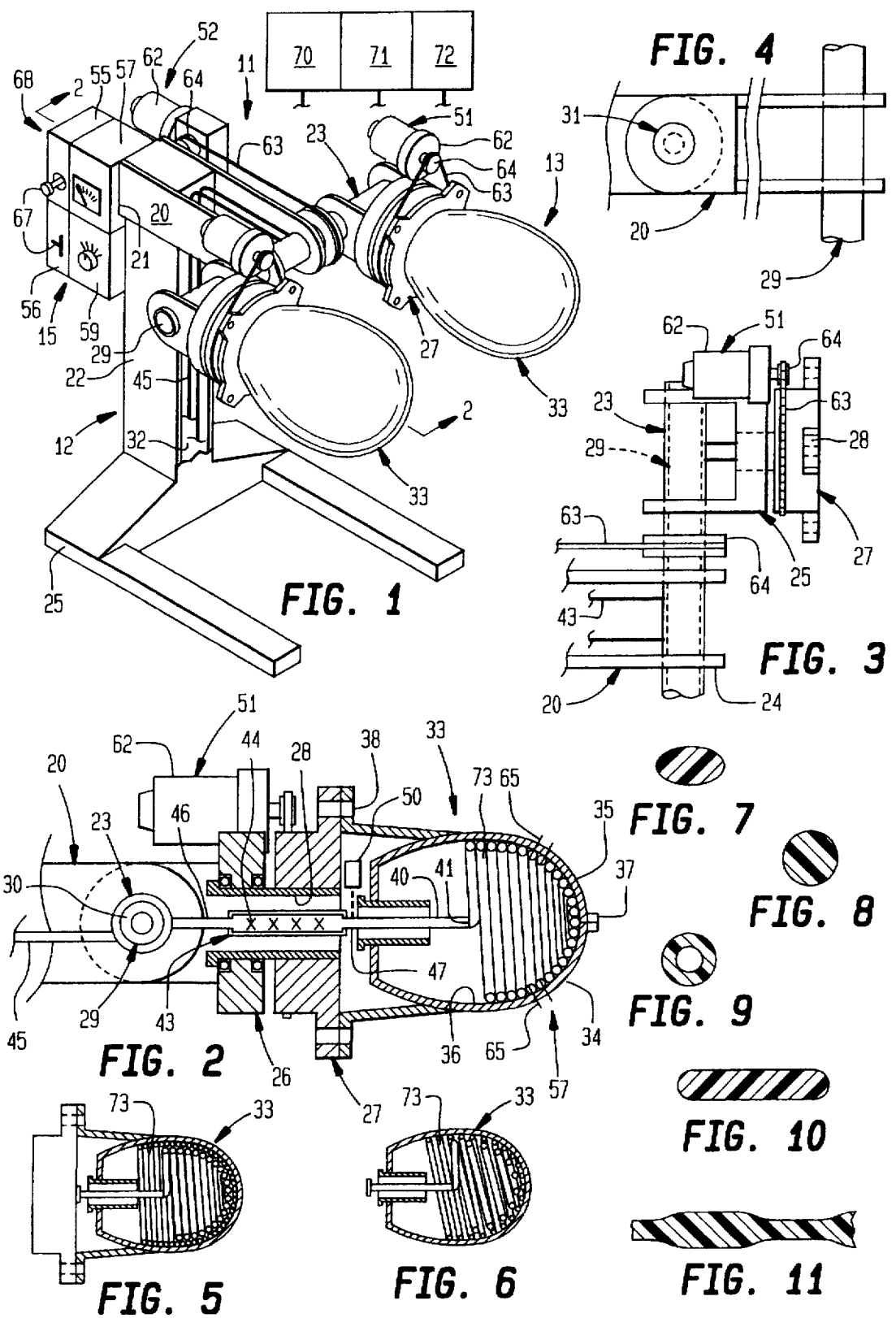

MULTIAXIS ROTATIONAL MOLDING APPARATUS

This application is a division of application Ser. No. 08/345,564, filed Nov. 25, 1994 now U.S. Pat. No. 5,503,780, which is a continuation-in-part of application Ser. No. 249,744, filed May 26, 1994, now U.S. Pat. No. 5,507,632, which in turn is a continuation-in-part of application Ser. No. 950,135, filed Sep. 24, 1992, now U.S. Pat. No. 5,316,701, which in turn is a division of application Ser. No. 707,656, filed May 30, 1991, now U.S. Pat. No. 5,188,845, which in turn is a continuation-in-part of application Ser. No. 417,502, filed Oct. 5, 1989, now U.S. Pat. No. 5,022,838, which in turn is a continuation-in-part of application Ser. No. 271,686, filed Nov. 16, 1988, now U.S. Pat. No. 4,956,133, which in turn is a continuation-in-part of application Ser. No. 202,267, filed Jun. 6, 1988, now U.S. Pat. No. 4,956,135, which in turn is a continuation-in-part of application Ser. No. 890,742, filed Jul. 30, 1986, now U.S. Pat. No. 4,749,533, which in turn is a division of application Ser. No. 766,498, filed Aug. 19, 1985, now U.S. Pat. No. 4,671,753.

This invention relates to a novel molding method and apparatus and more particularly relates to a new multiaxis rotational molding method and apparatus.

The production of man-made plastic and resin articles is an industry that utilizes a high degree of automatically controlled continuous processing. However, for units of appreciable size, batch processing still is the rule rather than the exception. For example, in the production of fiberglass structures such as boats, it is customary to construct the hulls by hand, building on an open mold in which a plurality of resin and fiberglass layers are sequentially laminated or a plurality of mixed resin/chopped fiber coatings are applied over the mold.

Such hand building procedures require a great amount of labor, supervision and continuous inspection to insure that a reasonable level of quality is achieved. This greatly increases the cost of the product.

The applicant's earlier patents listed above provide a novel method and apparatus for producing both large and small molded structures continuously. The apparatus includes unique combinations of components to produce a wide variety of different products. Achieving this capability requires a major capital investment. Also, personnel to utilize the broad parameters of the apparatus normally are highly trained and experienced.

The present invention provides a novel molding method and apparatus which not only overcome the deficiencies of present technology but also provide features and advantages not found in earlier expedients. The multiaxis rotational molding method and apparatus of the invention provide a simple inexpensive means for the production of uniform high quality products efficiently.

The multiaxis rotational molding method and apparatus of the present invention are simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The apparatus of the invention can be operated by individuals with limited mechanical skills and experience. High quality molded structures can be produced by such persons safely and efficiently with a minimum of supervision.

The molding method and apparatus of the invention can be modified to mold a wide variety of new structures. Variations both in product configuration and composition can be attained simply and conveniently with the method and apparatus of the invention. Even with such variations, uniformity and quality of product dimensions and shapes still are maintained without difficulty.

A novel method of the present invention for forming an integrally molded structure includes the steps of rotating a multisection mold assembly about at least three axes and flowing a first freshly formed polymerizable mixture over surfaces of an enclosed mold cavity within the mold assembly. The flowing of the first mixture over the mold cavity surfaces and formation of a first resin therefrom are monitored.

A second freshly formed polymerizable mixture is flowed under pressure through an orifice forming a liquid stream in the mold cavity. The liquid stream advancing through the mold cavity is gelled to form a continuous filament with structural integrity. The filament contacts the first resin formed within the mold cavity and is distributed thereover in a preselected pattern. The flowing of the second mixture and the formation and distribution of the filament over the first resin are monitored.

A third freshly formed polymerizable mixture is flowed over the second resin filaments distributed within the mold cavity. The flowing of the third mixture over the mold cavity surfaces and the formation of the third resin therefrom are monitored.

The rotation of the mold assembly is continued throughout the molding operation. Simultaneously, each axis rotation of the mold assembly is monitored individually. Also, the monitored flowing of each mixture and the monitored formation of each resin with each monitored axis rotation in a preselected profile are coordinated to form an integrally molded structure of the first, second and third resins.

The mold sections of the mold assembly are separated after the integrally molded structure has achieved structural integrity within the mold cavity. The structure is removed from the separated mold sections and the steps are repeated to form a multiplicity of the molded structures on a continuing basis.

Advantageously, a continuous filament is formed which has a generally circular, rectangular or oval cross section. Preferably, the continuous filament has a central passage along its length.

The continuous filament is distributed over the first resin previously deposited on the surface of the mold cavity to completely or partially cover the first resin. Also, it may be advantageous to distribute the filament in a preselected variable pattern. Preferably, the pattern may vary in density and/or thickness along its length and/or its width.

The method of the invention may include the preconditioning of raw material prior to forming the first, second and/or third polymerizable mixtures therewith. Also, the incorporation of a major proportion of a solid additive material to at least one of the polymerizable mixtures is advantageous. In addition, air or an inert gas may be entrained within the product during the molding operation.

BRIEF DESCRIPTION OF THE DRAWINGS

Benefits and advantages of the novel multiaxis rotatable molding method and apparatus of the present invention will be apparent from the following description and the accompanying drawings in which:

FIG. 1 is a view in perspective of one form of multiaxis rotatable molding apparatus of the invention;

3

FIG. 2 is a side view in section of the molding and mixing portions of the apparatus shown in FIG. 1 taken along line 2—2 thereof;

FIG. 3 is an enlarged fragmentary top view of a mold supporting assembly of the apparatus shown in FIG. 1;

FIG. 4 is a fragmentary top view of another form of arm member of the apparatus shown in FIG. 1;

FIG. 5 is a schematic illustration in section of the mold assembly shown in FIG. 2 during an intermediate molding step with the apparatus of the invention;

FIG. 6 is a schematic illustration in section of the mold cavity shown in FIG. 2 during another molding step with the apparatus of the invention;

FIG. 7 is a greatly enlarged schematic illustration of a cross section of a filament formed during a molding step with the apparatus of the invention;

FIG. 8 is a greatly enlarged schematic illustration of a cross section of a different filament formed during a molding step with the apparatus of the invention;

FIG. 9 is a greatly enlarged schematic illustration of a cross section of another filament formed during a molding step with the apparatus of the invention;

FIG. 10 is a greatly enlarged schematic illustration of a cross section of a further filament formed during a molding step with the apparatus of the invention; and FIG. 11 is a greatly enlarged schematic illustration of a fragmentary longitudinal section of a filament formed during a molding step with the apparatus of the invention.

DESCRIPTION OF THE PREFERRED EMBODIMENTS

As shown in FIGS. 1–4 of the drawings, one form of multiaxis rotational molding apparatus 11 of the present invention includes a support portion 12, a molding portion 13, a mixing portion 14 and a control portion 15.

The support portion 12 of the multiaxis rotational molding apparatus 11 of the invention includes an arm member 20 disposed in a generally horizontal orientation. One end 21 of arm member 20 extends from an upstanding supporting section 22. A transverse supporting member 23 extends from adjacent an opposite end 24 of the arm member 20. Advantageously, the support ? portion 12 includes a base section 25 from which the upstanding supporting section 22 extends.

The molding portion 13 of the rotational molding apparatus 11 includes a plurality of mold supporting assemblies 26. The mold supporting assemblies are rotatably mounted along the length of the transverse supporting member 23 in a spaced relationship.

Each mold supporting assembly 26 includes an independently rotatable mold connector section 27. Each mold supporting assembly also includes a central passage 28 therethrough. The central passage extends from a rotatable connection 29 with the transverse supporting member 23 and through the mold connector section 27.

Advantageously, the rotatable connection 29 of the transverse supporting member 23 and each mold supporting assembly 26 includes a rotatable coupling shown as swivel coupling 30. The arm member 20 advantageously also may include one or more pivotal connections 31 along its length. (FIG. 4).

The molding portion 13 further includes a plurality of mold assemblies 33. Each mold assembly includes at least two separable mold sections 34,35. The assembled mold sections form a substantially enclosed cavity 36. Connecting means shown as clamps 37 selectively secure the mold sections 34,35 together. Also, connecting means 38 secure the assembled mold sections to mold connector section 27. Each mold assembly 33 advantageously includes a vent 39 preferably disposed concentrically with a probe member 40.

The mixing portion 14 of the multiaxis rotational molding apparatus 11 of the present invention includes an elongated mixing section 43 associated with each mold assembly 33. Each mixing section 43 extends axially within the central passage 28 through each mold supporting assembly 26 adjacent the mold connector section 27. Each mixing section 43 also includes a plurality of deflector sections 44 disposed along the length thereof.

A plurality of inlet conduits 45 that extend along the arm member 20 and the transverse supporting member 23 are operatively connected to an inlet end 46 of each mixing section 43. Advantageously, the inlet conduits extend through the rotatable connections 29 with the mold supporting assemblies 26.

A hollow probe member 40 with an orifice 41 extends from an outlet end 47 of each mixing section 43 into mold cavity 36 of the adjacent mold assembly 33. The probe member 40 preferably is axially movable within mold cavity 36 by drive 50.

The control portion 15 of the molding apparatus 11 of the present invention includes actuating means including drive means 51,52 for each mold assembly. One drive means 51 rotates each mold connector section 27 and the mold assembly 33 affixed thereto. Another drive means 52 rotates each mold supporting assembly 26 and the mold assembly 33 affixed thereto with respect to the transverse supporting member 23.

The control portion 15 also includes programmable memory means 55, coordinating means 56, monitoring means 57 and circuitry 58 therefor. The drive means 51,52 advantageously includes gear motors 62, chains 63 and sprockets 64 connected thereto. Preferably, the gear motors are variable speed motors. The actuating means may activate other components such as pumps, valves, drives, etc.

Arm member 20 and transverse supporting member 23 advantageously include a longitudinal passage 32 in which inlet conduits 45 and control circuitry 58 are disposed. Preferably, the monitoring means 57 includes optical fibers 65 extending through the respective mold sections 34,35 as shown in FIG. 2.

The coordinating means 56 advantageously includes a process controller 59 that initiates changes in the flows of materials and speeds of drives for each mold assembly to bring variations therein back to the respective rates specified in the programs present in the memory 55. This coordination commonly is achieved through the transmission of information such as digital pulses from the monitors and/or sensors at the control components to the process controller 59.

The operating information is compared with the preselected programming parameters stored in the memory 55. If differences are detected, instructions from the controller change the operation of the components to restore the various Operations to the preselected processing specifications.

In the use of the multiaxis rotational molding apparatus 11 of the present invention, the designs of the structures desired first are established. Then, each design is programmed into the memory 55.

To start the operation of the apparatus 11, buttons and/or switches 67 of a control panel 68 are depressed to activate the memory 55 and the other components of the control portion 15. The coordinating means 56 energizes drive means 51,52.

Also, pumps, valves and monitors (not shown) are energized by the coordinating means 56 in the preselected sequences of the program stored in the memory 55. This causes the raw materials in reservoirs 70,71,72 to advance along the inlet conduits 45 toward the respective mixing section 43 associated with each mold assembly. For example, to mold a structure including a polyurethane resin, reservoir 70 may contain a liquid reactive resin forming material, reservoir 71 a particulate solid recyclable material and reservoir 72 and other reservoirs—colors, catalysts, etc. as required.

To produce high quality molded structures of the invention, it is important that the raw material delivered to each mixing section 43 be uniform in volume and composition. This can be facilitated by providing a continuous flow of raw materials to each mixing section and the immediate transfer of the mixture therefrom onto the cavity surface of the mold assembly 33. However, the volume of the mixture delivered will vary depending upon the particular incremental area being covered at any instant. Also, the delivery to a particular mold assembly will be terminated completely when a molded structure is being removed from that assembly.

Advantageously, a separate bypass conduit (not shown) is utilized from the end of each inlet conduit 45 at a point adjacent a particular mixing section 43 back to the respective reservoir. This construction provides for the delivery of a freshly formed uniform mixture from the mixing section even though the distance is considerable between the reservoirs and the mixing section which is located adjacent each mold assembly 33. The control portion 15 coordinates the operation of the various system components so the sequired formulation can flow onto the desired areas of the mold cavity.

Rotation of each mold assembly 33 about its longitudinal axis and rotational movement of the mold assembly about rotatable connection 29 perpendicular to its longitudinal axis are started and continue while each freshly formed polymerizable mixture is transferred from its mixing section 43 into the cavity 36 of each mold assembly 33. The double axis rotational movement and any arcuate movement are continued to complete the flow of the mixtures over all areas being covered. All movements are controlled within the parameters stored in the memory 55.

For particular structures, the movements about the respective axes may be continuous and/or intermittent at changing rates. Also, it may be desirable to provide arcuate rotation, that is, movement about an are such as a rocking motion. Monitors 57 located within each mold assembly 33 signal the process controller 59 when each polymerizable mixture has been distributed over preselected areas of the respective mold cavity so the controller can initiate the next step of the molding method.

After the first polymerizable mixture has been flowed over the cavity surface and a first resin layer has formed, the second polymerizable mixture is delivered through probe member 40 and orifice 41 under pressure to form a liquid stream. The second polymerizable mixture is preselected to gel quickly before the liquid stream contacts the first resin surface. The mold assembly is rotated about its multiple axes in a preselected rotational profile to distribute a filament 73 formed of the gelled stream over the first resin surface in a preselected pattern.

The distribution of the freshly formed filament can produce a tight pattern which is uniform over the pattern as shown in FIG. 2. Alternatively, the density and/or thickness of the pattern can vary. This can be accomplished by the spacing of the filament (FIGS. 5 and 6) or by forming a filament with variations in cross section along its length.

After the desired pattern has been formed, the flow of the second polymerizable mixture is stopped and the flow of the third polymerizable mixture is started. The mixture flows over the porous blanket formed by the filament distribution. A portion of the third mixture flows through the blanket binding together the filaments and the first resin layer below. This produces a unitary structure with superior properties.

FIGS. 7–10 schematically illustrate different cross-sectional filament configurations. FIG. 7 shows an oval, FIG. 8 a circle and FIG. 9 a circular configuration with a central passage. In FIG. 10, a generally rectangular cross section is shown. FIG. 11 illustrates a fragmentary longitudinal filament section which can be used to form an irregular pattern.

The filament pattern provides non-woven reinforcing fabric for a composite structure. Since the fabric is formed in situ as an integral step in the molding of the structure, the bonding of the polymerizable mixtures with the filament fabric is much stronger than would result with hand building methods in which the surfaces of pre-formed components become desensitized by exposure to the atmosphere. Thus, the molding method of the invention allows the use of lesser quantities of resin forming materials to achieve equivalent structural properties.

The in situ formed filament pattern also may be utilized to inspect and/or monitor a structure internally. This may be accomplished through the use of signal transmitting materials in the formation of the filament. In this way, the filament can function as an optical fiber to allow inspection from the interior both during the molding thereof and thereafter when the structure is in use.

Similarly, if the filament includes an open central passage, a micro-miniature TV camera can be passed along the passage to monitor the structure during or after molding. Other sensing components such as lasers also can be employed for the same or other purposes.

When the molded structure within the mold cavity 36 is sufficiently cured that it possesses structural integrity, rotation is stopped and the mold sections 34 and 35 are separated to free the unit. The molded structure then may be set aside to complete the curing of the resin therein. During this period, the molded structure, free of the mold's restraint, stresses the high density outer skin or layer. This stressing of the skin increases the strength and puncture resistance thereof and also the structural strength of the unit itself.

The polymerizable mixtures employed to produce structures of the invention are selected to be capable of reaction to form the particular resin desired in the final structure. Advantageously, the resin is a thermosetting resin such as a polyurethane or polyester. Should a polyurethane be desired, one reservoir 70,71,72 may contain an isocyanate and another reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be pre-mixed with one of the resin formers, e.g. fillers, reinforcements, colors and the like.

The use of rapid gelling resin formers enables continuous bonded non-woven fabric matrices to be formed in situ during molding.

The particulate solid additive material may be any of a wide variety of inexpensive materials readily available at a particular job site. Natural mineral particulate material such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

The above description and the accompanying drawings show that the present invention provides a novel multiaxis rotational molding method and apparatus which not only overcome the deficiencies and shortcomings of earlier expedients, but in addition provide novel features and advantages not found previously. The method and apparatus of the invention provide simple inexpensive means for producing uniform high quality products efficiently.

The apparatus of the invention is simple in design and relatively inexpensive. Commercially available materials and components can be utilized in the fabrication of the apparatus using conventional metal working techniques and procedures.

Structures can be produced automatically with the apparatus of the invention by operators with limited experience and aptitude after a short period of instruction. The apparatus is durable in construction and has a long useful life with a minimum of maintenance.

The method and apparatus of the invention can be utilized to mold a wide variety of different products. Variations in structure, configuration and composition of the products can be achieved simply and quickly with the method and apparatus of the invention.

It will be apparent that various modifications can be made in the multiaxis rotational molding method and apparatus described in detail above and shown in the drawings within the scope of the present invention. The size, configuration and arrangement of components can be changed to meet specific requirements. For example, more than two mold assemblies may be utilized, and they may be arranged in different orientations with respect to one another. In addition, the number and sequence of processing steps may be different. Also, the apparatus may include other drive and actuating components and mechanisms.

These and other changes can be made in the method and apparatus described provided the functioning and operation thereof are not adversely affected. Therefore, the scope of the present invention is to be limited only by the following claims.

What is claimed is:

1. Multiaxis rotational molding apparatus including a support portion, a molding portion, a mixing portion and a control portion; said support portion including an arm member disposed in a generally horizontal orientation and having one end extending from an upstanding supporting section, a transverse supporting member extending from adjacent an opposite end of said arm member; said molding portion including a plurality of mold supporting assemblies rotatably disposed along the length of said transverse supporting member, each of said mold supporting assemblies including an independently rotatable mold connector section, each of said mold supporting assemblies including a central passage therethrough, a plurality of mold assemblies each including at least two separable mold sections forming a substantially enclosed cavity, connecting means selectively securing said mold sections together and connecting said mold sections to said mold connector section; said mixing portion including an elongated mixing section extending axially within said central passage through each of said mold supporting assemblies adjacent said mold connector section, said mixing section including a plurality of deflector sections disposed along the length thereof, a plurality of inlet conduits extending along said elongated mixing section, each inlet conduit operatively connected to an inlet end of each of said mixing sections, a hollow probe member extending from an outlet end of each mixing section into said cavity of said adjacent mold assembly; said control portion including actuating means rotating each mold connector section and said mold assembly affixed thereto and actuating means rotating each mold supporting assembly and said mold assembly affixed thereto with respect to said transverse supporting member, programmable memory means storing preselected operating parameters, monitoring means sensing operating information from control components, circuitry transmitting means for transmitting signals from said monitoring means to coordinating means, said coordinating means comparing said operating information with said operating parameters stored in said memory means and activating said actuating means to control formation of a molded structure in said cavity in a preselected multiaxis mold rotational profile.

2. Multiaxis rotational molding apparatus according to claim 1 wherein said arm member includes at least one pivotal connection along a length thereof.

3. Multiaxis rotational molding apparatus according to claim 1 including actuating means axially moving said probe member within said mold cavity.

4. Multiaxis rotational molding apparatus according to claim 1 wherein said actuating means includes a variable speed gear motor, a chain and sprockets.

5. Multiaxis rotational molding apparatus according to claim 1 wherein each of said mold assemblies includes a vent disposed concentrically with said probe member.

6. Multiaxis rotational molding apparatus according to claim 1 wherein said support portion includes a base section from which said upstanding supporting section extends.

7. Multiaxis rotational molding apparatus according to claim 1 wherein said monitoring means includes optical fibers extending through said mold sections.

* * * * *